(12) United States Patent
Carlson

(10) Patent No.: US 8,229,852 B2
(45) Date of Patent: Jul. 24, 2012

(54) SECURE MOBILE PAYMENT SYSTEM

(75) Inventor: Mark Carlson, Half Moon Bay, CA (US)

(73) Assignee: Visa International Service Association, San Francisco, CA (US)

( * ) Notice: Subject to any disclaimer, the term of this patent is extended or adjusted under 35 U.S.C. 154(b) by 30 days.

(21) Appl. No.: 12/145,352

(22) Filed: Jun. 24, 2008

(65) Prior Publication Data

US 2008/0319905 A1      Dec. 25, 2008

Related U.S. Application Data

(60) Provisional application No. 60/946,113, filed on Jun. 25, 2007.

(51) Int. Cl.
*G06Q 40/00* (2012.01)
(52) U.S. Cl. ............................................. 705/44; 705/39
(58) Field of Classification Search ...................... 705/39
See application file for complete search history.

(56) References Cited

U.S. PATENT DOCUMENTS

| | | | | |
|---|---|---|---|---|
| 6,253,328 | B1* | 6/2001 | Smith, Jr. .......................... | 726/18 |
| 2001/0034720 | A1* | 10/2001 | Armes .............................. | 705/65 |
| 2002/0035539 | A1* | 3/2002 | O'Connell ........................ | 705/39 |
| 2002/0059146 | A1 | 5/2002 | Keech | |
| 2002/0128977 | A1* | 9/2002 | Nambiar et al. ................. | 705/64 |
| 2002/0133467 | A1* | 9/2002 | Hobson et al. ................... | 705/64 |
| 2002/0170960 | A1 | 11/2002 | Ehrensvard et al. | |
| 2004/0210449 | A1* | 10/2004 | Breck et al. ........................ | 705/1 |
| 2005/0065875 | A1* | 3/2005 | Beard .............................. | 705/38 |
| 2005/0077349 | A1* | 4/2005 | Bonalle et al. .................. | 235/380 |
| 2006/0026098 | A1* | 2/2006 | Peckover et al. ................. | 705/40 |
| 2006/0175396 | A1* | 8/2006 | Call et al. ........................ | 235/380 |
| 2007/0083444 | A1* | 4/2007 | Matthews et al. ................ | 705/30 |
| 2008/0275779 | A1* | 11/2008 | Lakshminarayanan .......... | 705/14 |
| 2008/0306876 | A1* | 12/2008 | Horvath et al. .................. | 705/76 |

FOREIGN PATENT DOCUMENTS

KR      10-2003-0020189 A      3/2003

(Continued)

OTHER PUBLICATIONS

Security Concerns Usher in "Disposable" Credit Cards. Credit Card News, p. 1 Sep. 15, 2000.*

(Continued)

*Primary Examiner* — William Rankins
(74) *Attorney, Agent, or Firm* — Kilpatrick Townsend & Stockton LLP

(57) ABSTRACT

The present invention provides a method for conducting a transaction that includes receiving a pseudo account identifier that corresponds to a primary account identifier. The pseudo account identifier may be received at a portable wireless device and may be generated by a remote server computer. The portable wireless device can receive the pseudo account identifier over a first network and provide the pseudo account identifier to an access device. The access devices generally comprises a reader that can receive the pseudo account identifier, and thereafter send a message to request authorization of a transaction. The authorization request message may include the pseudo account identifier and is sent to a payment processing network. The authorization request message is sent to the payment processing network over a second network. The payment processing network may then process the authorization message and return a response that indicates if the transaction is authorized or not.

19 Claims, 7 Drawing Sheets

FOREIGN PATENT DOCUMENTS

| | | |
|---|---|---|
| KR | 10-2006-0022304 A | 3/2006 |
| KR | 10-2006-0111200 A | 10/2006 |
| WO | WO 2001/088785 A1 | 11/2001 |
| WO | WO 03/075192 A1 | 9/2003 |
| WO | WO 2005/073931 A2 | 8/2005 |

OTHER PUBLICATIONS

Search/Examination Report dated Dec. 27, 2011 from European Patent Application No. 08771916.7, 10 pages.

The First Australian Examination Report for Application No. 2008268373, dated May 2, 2012, 3 pages.

* cited by examiner

SECURE MOBILE PAYMENT SYSTEM

CROSS-REFERENCES TO RELATED APPLICATIONS

This application claims priority to U.S. Provisional Patent Application No. 60/946,113 filed Jun. 25, 2007, entitled "Payment Transaction System and Method," which is hereby incorporated by reference in its entirety.

Names of Parties to a Joint Research Agreement

Visa International Service Association, Inc. and Visa U.S.A. Inc. are parties to a Joint Research Agreement.

BACKGROUND

Embodiments of the present invention relate to portable wireless devices that may be used to conduct contactless payment transactions. More specifically, embodiments of the present invention relate to conducting those transactions in a secure manner.

In today's society the presence of portable wireless devices carried by consumers has become almost ubiquitous. Cellular telephones, Personal Digital Assistants (PDAs), pagers, and the like are being carried by larger and larger numbers of people. These devices are being used to perform a wide variety of tasks, such as standard voice communications, e-mail access, internet web surfing, and a whole host of other activities. One of the activities that is currently contemplated is the use of a portable wireless device to act as a replacement for a payment card, such as a standard credit or debit card.

At least one major manufacturer of cellular phones has introduced a phone that is capable of being used as a payment card. In addition to the standard elements and capabilities of a cellular phone, the device also contains an additional element that is capable of storing a user's payment card information, such as their credit card account number, in the element on the phone. This element is further tied in with a short range wireless transmission element, such as a Radio Frequency Identification (RFID) tag, to allow the phone to transmit the account number over a short range to a contactless reader.

Contactless readers are becoming more and more commonplace in the market as a replacement for standard credit card readers. As opposed to a standard card reader, whose operation involves a merchant or the consumer physically sliding the payment card through the card reader in order for the payment card account information to be read, a contactless card reader is able to retrieve the payment card information from the device through the use of a short range radio transmission, such as those provided by RFID tags. The device need only be held in the vicinity of the contactless reader. A real world example of such a contactless reader can be seen in a payment system offered by a major gasoline seller in the US. In that system, a consumer is issued a small device that may be attached to a keyring, and that further contains the consumers payment account information and a short range wireless transmission element. When the user purchases gasoline at the pump, he merely needs to wave this device in front of a designated area on the pump, and the payment account information is transferred to the seller to process the transaction.

Although the use of contactless card readers provides for increased convenience to the user, there are also disadvantages that this technology presents. Due to the wireless nature of the contactless reader, it is possible that the contactless reader may be used for surreptitious interrogation of the portable wireless device by intercepting the portable wireless device's communications. In addition, it is conceivable that a contactless reader may be developed or modified to enhance its power and sensitivity and thereby increase its ability to interrogate with and intercept signals from the portable wireless device from a greater distance than specified in standards used for contactless readers.

Theft of sensitive information, such as an account number, using wireless interrogation or interception of communications from portable wireless device is a major concern for consumers and businesses alike. Unfortunately, given the sophistication of the wireless interrogation equipment and the nature of wireless signals, it is easy for wireless interrogation to occur at virtually any time and place. Once the victim of the wireless interrogation discovers that they had sensitive information stolen, it is often too late to discover where the theft took place. The victim must then deal with the consequences and hassle of correcting the unauthorized access and possible uses of the information.

In response to such risk, many payment service providers have instigated safeguards for protecting purchases from fraudulent attacks, for example, by employing encryption technologies to encrypt the payment account number and other data associated with account transactions. Encryption generally involves encrypting transaction data on one end of a transmission with a key, and then regenerating the original transaction data by decrypting the encrypted data received with the same key on the other end of the transmission. While encryption technologies have proven to be highly effective in preventing information theft, implementing or upgrading to the latest encryption technology often requires upgrades by the end users of payment processing networks. Due to the cost, time, and risk of potential business interruption (e.g., loss of sales), many merchants, for example, resist making necessary upgrades to their procedures and systems to implement such safeguards. Therefore, such safeguards have had limited success as they are generally expensive to implement, can be overcome, and have not been fully accepted by the credit card industry, merchants, payment processors, etc.

In the case of a portable wireless device, such as that described above in relation to a cellular phone, it may be possible to require some type of code, such as a Personal Identification Number (PIN) to be entered prior to enabling the short range wireless transmission element. Although this may partially resolve the issue of the wireless transmission being intercepted while the user is not actively using the device, it still does not resolve the situation where the sensitive information is intercepted while the user is making a legitimate purchase and has thus already entered the PIN.

Therefore, what is needed is a cost effective device and method that integrates easily with existing payment processing networks and prevents an unauthorized user from using data wirelessly interrogated or intercepted from a portable wireless device.

Embodiments of the invention address the above problems and other problems individually and collectively.

BRIEF SUMMARY

Embodiments of the present invention provide a device and methods for conducting transactions using pseudo primary account identifiers from portable wireless devices.

Embodiments of the invention include the use of "primary account identifiers" and "pseudo primary account identifiers." A "primary account identifier" is an example of an "account identifier." A "pseudo primary account identifier" is also an example of a "pseudo account identifier." These account identifiers may include account numbers or any other alphanumeric sequence. An account identifier may be used to relate a transaction to a specific account.

In one embodiment, the present invention provides a method for conducting a transaction that includes receiving a pseudo account identifier that corresponds to a consumer's account identifier. The pseudo account identifier may be received at a portable wireless device and may have been previously generated by a remote server computer. The portable wireless device can receive the pseudo account identifier over a first network. This embodiment may also include providing the pseudo account identifier to an access device. The access device may generally comprise a reader that can receive the pseudo account identifier, and thereafter send a message to request authorization of a transaction. The reader may be a contact based reader or a contactless reader. The authorization request message may include the pseudo account identifier and may be sent to a payment processing network. Generally, the authorization request message may be sent to the payment processing network over a second network. The payment processing network may then process the authorization message and return a response that indicates if the transaction is approved or not approved.

In another embodiment, the present invention provides a method that includes receiving a request for a pseudo account identifier, wherein the pseudo account identifier corresponds with an account identifier. The request for the pseudo account identifier may be received over a first network. The method may further include generating a pseudo account identifier, where the pseudo account identifier is generally related to an account identifier. The pseudo account identifier may then be sent to a portable wireless device over the first network. Thereafter, the portable wireless device may use the pseudo account identifier to conduct one or more transactions, by providing the pseudo account identifier to an access device.

In yet another embodiment, the present invention provides for receiving a pseudo primary account identifier from a portable wireless device. The pseudo primary account identifier may be generally related to a primary account identifier. The method may further comprise sending a transaction authorization request that may contain the pseudo account identifier. The pseudo primary account identifier may then be received by a payment processing network and the payment processing network can convert the pseudo primary account identifier to the related primary account identifier. The authorization request message can then be processed using the primary account identifier and the transaction may be approved or denied and a response to the authorization request may be sent. The authorization response message may then be received and its contents can indicate if the transaction is approved or not approved.

In yet another embodiment, the present invention provides a portable wireless device for performing contactless transactions. The portable wireless device may include a long range wireless communications element. The portable wireless devices may also include a short range communications element. The portable wireless device can also includes a processor that is coupled to both the long and short range wireless communications elements. The processor can also be coupled to a memory that comprises computer code that allows the portable wireless device to receive a pseudo account identifier that generally corresponds to a primary account identifier. The pseudo account identifier may be generated by a remote server and sent to the portable wireless device over a first network. The pseudo account identifier may then be received by the portable wireless device by using the long range communications element. The memory may also comprise code that allows the portable wireless device to provide the pseudo account identifier to an access device. The portable wireless device can generally provide the pseudo account identifier to the access device by using the short range communications element. The memory may also contain code that allows the potable wireless device to store a primary account identifier.

In yet another embodiment, the present invention provides a method for conducting a transaction that includes generating a pseudo account identifier that corresponds to a consumer's account identifier. The pseudo account identifier may be sent by a portable wireless device and may be sent to a remote server computer. The portable wireless device can send the pseudo account identifier over a first network. This embodiment may also include providing the pseudo account identifier to an access device. The access device may generally comprise a reader that can receive the pseudo account identifier, and thereafter send a message to request authorization of a transaction. The reader may be a contact based reader or a contactless reader. The authorization request message may include the pseudo account identifier and may be sent to a payment processing network. Generally, the authorization request message may be sent to the payment processing network over a second network. The payment processing network may then process the authorization message and return a response that indicates if the transaction is approved or not approved.

In yet another embodiment, the present invention provides a method that includes receiving a pseudo account identifier, wherein the pseudo account identifier corresponds with an account identifier. The pseudo account identifier may be received over a first network. The method may further include storing the pseudo account identifier, where the pseudo account identifier is generally related to an account identifier. A receipt acknowledgement may then be sent to a portable wireless device over the first network. Thereafter, the portable wireless device may use the pseudo account identifier to conduct one or more transactions, by providing the pseudo account identifier to an access device.

In yet another embodiment, the present invention provides a portable wireless device for performing contactless transactions. The portable wireless device may include a long range wireless communications element. The portable wireless devices may also include a short range communications element. The portable wireless device can also includes a processor that is coupled to both the long and short range wireless communications elements. The processor can also be coupled to a memory that comprises computer code that allows the portable wireless device to generate a pseudo account identifier that generally corresponds to a primary account identifier. The pseudo account identifier may be sent to a remote server by the portable wireless device over a first network. The pseudo account identifier may then be sent to the remote server by using the long range communications element. The memory may also comprise code that allows the portable wireless device to provide the pseudo account identifier to an access device. The portable wireless device can generally provide the pseudo account identifier to the access device by using the short range communications element. The memory may also contain code that allows the potable wireless device to store a primary account identifier.

These and other embodiments of the invention are described in further detail below.

DETAILED DESCRIPTION

Figure 1:
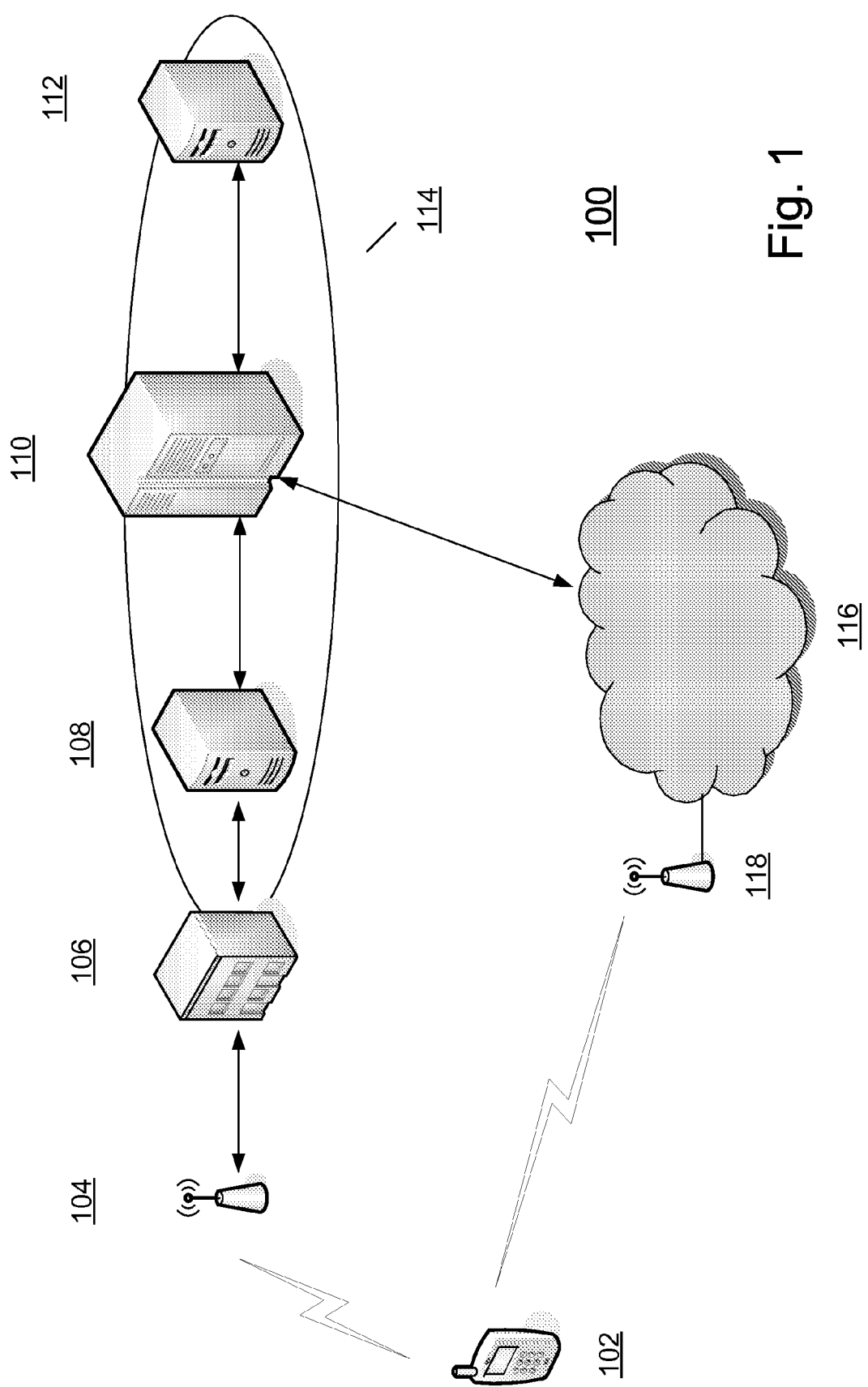
FIG. 1 is a high level diagram illustrating one embodiment of a transaction processing system in accordance with the present invention.

Embodiments of the invention are directed to the use of a pseudo account identifier such as a pseudo primary account identifier obtained by a portable wireless device. A portable wireless device according to an embodiment of the invention may be a mobile cellular phone, a PDA, and the like, capable of wireless transmission of a pseudo primary account identifier, in lieu of a user's real account identifier such as a primary account identifier (PAI) or a user's real primary account number (PAN). The portable wireless device may also be capable of receiving a pseudo primary account identifier that corresponds to a real account identifier.

Pseudo primary account identifiers may include account identifiers that are similar in format to a consumer's real account identifier. For example, if a user's real primary account identifier contains nineteen digits, the pseudo primary account identifier may also contain nineteen digits. In some embodiments, the pseudo primary account identifier may be of any length or type as long as it resembles the format of a real primary account identifier, such as a credit card number, debit card number, gift card number, and the like. For example, the pseudo primary account identifier may resemble a gift card number that is twenty one digits in length, when the user's real primary account identifier is nineteen digits long. The pseudo primary account identifier may also be described using terms such as bogus, fake, decoy, substitute, or the like.

From a merchant's perspective, transaction processing using a pseudo primary account identifier is completely transparent. That is to say that a merchant processing a transaction using a pseudo primary account identifier can process the transaction in exactly the same manner as if the transaction was occurring with a real primary account identifier. In some embodiments, it is actually preferable that the merchant have no knowledge as to whether a real or pseudo primary account identifier is being used in the transaction. As such, a merchant can continue to process transactions with currently installed equipment and no change is required at the merchant in order to process transactions using pseudo primary account identifiers.

In embodiments of the invention, the pseudo primary account identifier may be received by the portable wireless device through the use of any suitable communications network. Examples of such networks may include the cellular telephone network, networks provided by wireless e-mail service providers, and the like. Typically, these networks are open access networks and provide features and services that may be completely unrelated to transaction processing. For example, the cellular telephone network may be used for general voice communication. The cellular telephone network may also be used for data communications, to enable the user to perform tasks such as surfing the internet, reading e-mail, or any other tasks that are associated with a general purpose data network.

In one embodiment of the invention, a portable wireless device may have stored within its internal memory one or more primary account identifiers. A consumer who wishes to perform a transaction using the portable wireless device may begin by first enabling the device. Enabling the device may comprise turning the device on or entering a personal identification number (PIN) or password into the device to allow the user to access the device's functions. The user may then select which account he wishes to use to perform the transaction by selecting from among the one or more primary account identifiers that have been stored in the device. Selection of a primary account on the portable wireless device can occur using any suitable input mechanism. Examples can include keypad entry, touch screen entry, with or without a stylus, keyboard entry, voice response entry, and the like.

In this exemplary embodiment, the portable wireless device may then access the communications network through the use of one or more wireless access points provided by the network. The particular structure of a wireless access point may vary depending on the specific communications network, however access to a wireless communications network by a portable wireless device through the use of a wireless network access point is well known. For example, wireless communication from a cellular telephone to cellular base station wireless access points to gain access to the cellular telephone network is well known. Other types of wireless access technologies may include Bluetooth, WiFi, and the like.

Upon gaining access to the communications network, in this exemplary embodiment, the portable wireless device may send a request through the communications network to a payment processing network in order to retrieve a pseudo primary account identifier that corresponds to the primary account identifier that was previously selected. This request may be in the form of a message that includes sufficient information to identify for which primary account a pseudo primary account identifier is desired. In the simplest case, this request message may include the primary account identifier. In response, the payment processing network can return a pseudo primary account identifier that corresponds to the primary account identifier. The payment processing network may dynamically generate the pseudo primary account identifier, select it from a list of predefined pseudo primary account identifiers, or use any other means to create a pseudo primary account identifier. The payment processing network can further store the pseudo primary account identifier's relationship to the primary account identifier. The payment processing network can respond to the request from the portable wireless device with a response message that contains a pseudo primary account identifier. The response can be sent over the communications network back to the portable wireless device.

In addition to storing the relationship of the pseudo primary account identifier to the primary account identifier, the payment processing network may also store additional details about the relationship. For example, the pseudo primary account number may be set to expire after a certain number of transactions or after a certain time period. Doing so can help to ensure that if for some reason a pseudo primary account number is revealed to anyone other than an authorized user, the amount of damage that can be done is limited due to the limited lifetime of the pseudo primary account number.

Although in the exemplary embodiment described above, the pseudo primary account identifier is sent by the payment processing network in response to a request from the portable wireless device, the present invention is not limited to such implementations. In alternative implementations, the pseudo primary account identifier may not be requested at all, but rather is pushed to the portable wireless device at any time, such as when the device is turned on, when the device is idle, periodically, or through any other such criteria. Likewise, in the exemplary embodiment presented above, a request for a pseudo primary account identifier need not occur only after a user has enabled the device and selected an account. A request for a pseudo primary account identifier corresponding to a primary account identifier may occur at any time, such as when the device is turned on, when the device is idle, periodically, or through any other such criteria.

In an alternative embodiment, the pseudo primary account identifier may not be requested by the portable wireless device at all. The portable wireless device may generate the pseudo primary account identifier. The generated pseudo primary account identifier may then be sent to the payment processing network over the communications network. The payment processing network can store the received pseudo primary account identifier and store the association with the primary account identifier. The payment processing network can send an acknowledgement to the portable wireless device indicating that the pseudo primary account identifier has been received.

The payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a single message system (SMS) that automatically authorizes and provides enough information to automatically clear and settle a financial transaction, and/or a VIP system (Visa Integrated Payments system) which processes authorization requests and a Base II system, which performs clearing and settlement services.

In an exemplary embodiment, once the portable wireless device has a pseudo primary account identifier that is associated with a primary account identifier and has been enabled for use, the user may then proceed to use the portable wireless device to conduct a transaction. Typically, in addition to the elements for the portable wireless device to communicate with the communications network, the device can also have elements for shorter range wireless communication (e.g. near field communication). In one embodiment, the shorter range communication element may be a Radio Frequency Identification (RFID) tag or element, although embodiments of the invention are not limited to the use of RFID, and any suitable form of short range wireless transmission may be used. In alternative embodiments, the same elements that are used for communications with the communications network may also be used for the short range transmission.

The user may then utilize the short range wireless transmission element of the portable wireless device to transmit the pseudo primary account number to a contactless reader at a merchant site. A contactless reader can be part of an access device, which can have wireless communication and transmission modules (e.g., receiver, transceiver, etc.). Such contactless readers may be present in access devices such as point-of-sale (POS) terminals, ATMs (automatic teller machines), and the like. The portable wireless devices according to embodiments of the invention may operate with any number of such contactless reader devices using a variety of operating standards.

Although this exemplary embodiment has referred to access devices that contain contactless readers, the present invention is not limited to access devices containing contactless readers. Any suitable form of access device, including both contact and contactless access devices, are within the scope of embodiments of the present invention.

After receiving the pseudo primary account identifier from the contactless device, the merchant may then use that identifier, as well as additional information to form an authorization request message. An authorization request message can include a request for authorization to conduct an electronic payment transaction or some other type of activity. It may include one or more of an account holder's payment account number, currency code, sale amount, merchant transaction stamp, acceptor city, acceptor state/country, POS transaction number, POS transaction type, etc. Optionally, an authorization request message may be protected using a secure encryption method—e.g., 128-bit SSL or equivalent—in order to prevent data from being compromised.

Because the pseudo primary account identifier can be transitory and may have a limited lifetime, it can be noted that this provides a level of protection to the consumer's account. If the pseudo primary account identifier transmitted between the portable wireless device and the contactless reader is intercepted, it would be of limited or no use to a person wishing to use it for conducting unauthorized transactions, as it would likely have expired before any illicit use could be made. It is further noted that the primary account is also protected from unscrupulous merchants because the merchant only receives the transitory pseudo primary account identifier and never receives the real primary account identifier.

Additionally, because the pseudo primary account identifier is structured in such a way as to be indistinguishable from a real primary account identifier, the merchant will not have to alter any of his transaction processing systems. From the merchants point of view, the transaction proceeds exactly the same, regardless of if a real or pseudo primary account identifier is being used.

As mentioned above, transaction processing from the merchant's point of view occurs without any changes. Typically, after the merchant generates an authorization request message, that message is sent to the merchant's acquirer. An acquirer is typically a business entity (e.g., a commercial bank) that has a business relationship with a particular merchant. The authorization request message is typically sent to the acquirer using a transaction processing network. The transaction processing network is typically more secure than the communications network that has been discussed previously, because access is generally limited to only those parties that are involved in the authorization and settlement of transactions.

The acquirer can then forward the authorization request message to the payment processing network using the transaction processing network. The payment processing network, having previously generated or received the pseudo primary account identifier and stored the relationship to a primary account identifier, may then convert the pseudo primary account identifier in the authorization request message back to the real primary account identifier. Conversion of the pseudo primary account identifier to the real primary account identifier can be done through any suitable means, such as a mathematical operation, a database table look up, generating the primary account identifier based on the pseudo primary account identifier, or any other means that are well known. The authorization request message that now contains the real primary account identifier may then be sent to the issuer of the primary account identifier.

An issuer is typically a business entity (e.g., a bank) that issues accounts, such as a credit or debit card to a consumer. These accounts are generally identified by a primary account identifier. Some entities such as American Express perform both issuer and acquirer functions. Embodiments of the invention encompass such single entity issuer-acquirers.

Typically, an electronic payment transaction is authorized if the consumer conducting the transaction has sufficient funds or credit to conduct the transaction. Conversely, if there are insufficient funds or credit in the consumer's account, or if the consumer's portable wireless device is on a blacklist (e.g., it is indicated as stolen), then an electronic payment transaction may not be authorized (e.g., declined). After making a determination if the transaction is authorized or not, the issuer may return an authorization response to the payment processing network over the transaction processing network. The payment processing network may then return this response to the acquirer over the transaction processing network. The response may then be finally sent back to the originating merchant from the acquirer over the transaction processing network.

The user, through the merchant, then receives indication from the response to indicate that the transaction has been approved or denied. Examples of such indication could be an approval message displayed on a screen at the merchant or a receipt being printed at the merchant.

Throughout the discussion above of exemplary embodiments of the present invention, reference has been made to a communications network and a transaction processing network. Although referenced as two separate networks, it should be understood that the networks may share some common physical elements. For example, the portable wireless communications device may access the communications network through the use of a wireless network access point. From there, messages sent from the device to the payment processing network may be sent over a general purpose network such as the Internet. Likewise, communications in the transaction processing network, such as those between the acquirer and the payment processing network or those between the payment processing network and the issuer, may also be sent over the Internet. Through the use of various protocols, encryptions, network configurations, and the like, which are all known within the art, the communications network and the transaction processing network may be thought of as two logically separated networks, despite the fact that they may share some common physical elements.

FIG. 1 is a high level diagram illustrating one embodiment of a transaction processing system 100. The transaction processing system 100 includes a portable wireless device 102, an contactless reader 104, a merchant 106, an acquirer 108, a payment processing network 110, an issuer 112, a transaction processing network 114, a communications network 116, and a wireless access point 118. The components illustrated in FIG. 1 can be in operative communication with each other.

The portable wireless device 102 according to embodiments of the invention may be in any suitable form. For example, the portable wireless device 102 may include any such device that contains a wireless communication element. Such devices may include cellular telephones, Personal Digital Assistants (PDA), pagers and the like. Such portable wireless devices 102 can have one or more antennas coupled with wireless transmission elements to wirelessly transmit and receive data using a wireless communications media. One exemplary embodiment of a portable wireless device 102 may include a cellular telephone. The cellular telephone may be equipped with one or more antennas that are coupled with long range transmission elements to allow the cellular telephone to communicate with a communications network 116, such as the cellular telephone network.

In this exemplary embodiment, the cellular telephone 102 may communicate with the cellular network 116 through the use of one or more wireless access points 118. The access points 118 may be wireless base stations that provide coverage to large geographic areas or may be more localized such as those access points that provide in building coverage. In any case, access to the communications network 116 is provided to the portable wireless device through the use of wireless access points 118. There are many forms of wireless access to a communications network that would be know to a person of skill in the art and any suitable alternative would be within the scope and spirit of the present invention.

The communications network 116 may be one of any suitable form. As discussed above, one such network may be the cellular telephone network. Other examples may include the public switched telephone network, a proprietary network such as the RIM network, or any other network capable of transmitting and receiving data between two or more endpoints. The communications network 116 allows for a communications channel between any two suitably configured end points.

The portable wireless device 102 may also contain a short range transmission element that may be used to communicate with a contactless reader 104. The short range transmission element can be one of many types that would be well known to a person of skill in the art. Examples of these types of communications elements could be elements such as Radio Frequency Identification Tags (RFID), optical communications, such as through the use of optical transponders, or any other method of communications over a short range that are known in the art. The contactless reader 104 may be a device capable of communicating with the portable wireless device and may contain communications elements to support such communications. The contactless reader 104 may be capable of wirelessly receiving primary and pseudo primary account identifiers. The contactless reader 104 can be located at a merchant's 106 location, or may be simply operated by the merchant 106.

The merchant 106 may also be operatively connected to an acquirer 108 through at least a portion of a transaction processing network 114. The acquirer 108 may be operatively coupled to one or more merchants 106 in order to provide the merchants 106 with access to a payment processing network 110. The acquirer 108 in turn may be operatively coupled to a payment processing network 110 through the transaction processing network 114. The acquirer 108 may receive transaction requests from the merchant 106 and transmit the transaction requests to the payment processing network 110. The acquirer 108 typically communicates with the payment processing network through the use of a secured communications channel, such as that provided by the transaction processing network 114. Although the secured communications channel may make use of elements of the communications network 116, access to the payment processing network 110 by the merchant 106 through the acquirer 108 is restricted.

The payment processing network 110 may include data processing subsystems, networks, and operations used to support and deliver authorization services, exception file services, and clearing and settlement services. An exemplary payment processing network 110 may include VisaNet™. Payment processing networks such as VisaNet™ are able to process credit card transactions, debit card transactions, and other types of commercial transactions. VisaNet™, in particular, includes a single message system (SMS) that automatically authorizes and provides enough information to automatically clear and settle a financial transaction, and/or a VIP system (Visa Integrated Payments system) which processes authorization requests and a Base II system, which performs clearing and settlement services.

The payment processing network 110 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. The payment processing network 110 may use any suitable wired or wireless network, including the Internet.

The payment processing network 110 may further be connected to a communications network 116. This connection allows the payment processing network to send and receive messages to any other entity that may also be connected to the communications network 116. Although the payment processing network 110 may make use of common physical network elements to communicate with acquirers 108 and portable wireless devices 102, it is understood that embodiments of the invention allow for communication with the payment processing network 110 through the use of at least two separate communications channels (e.g., the transaction processing network 114 and the communications network 116). The first channel, or network may be a publicly available communications network 116, such as the cellular telephone network. The second channel, or network, may be a restricted access network, such as the one used to communicate between acquirers 108 and the payment processing network 110.

The payment processing network 110 may be configured to receive a request for a pseudo primary account identifier that corresponds to a primary account identifier over the communications network 116. The payment processing network 110 may then generate a pseudo primary account number corresponding to a primary account number and return the pseudo primary account number to the source of the request using the communications network 116. Additionally, the payment processing network 110 can store the pseudo primary account identifier that was generated so that it may be later converted back into the associated primary account identifier.

In an alternative embodiment, the payment processing network 110 may be configured to receive a pseudo primary account identifier that corresponds to a primary account identifier over the communications network 116. The payment processing network 110 may then store the pseudo primary account number corresponding to a primary account number and return an acknowledgement to the source of the request using the communications network 116. Additionally, the payment processing network 110 can store the pseudo primary account identifier that was received so that it may be later converted back into the associated primary account identifier.

As used herein, "generated" pseudo account identifiers can include those that are created for the first time for the particular transaction or transactions taking place. A pseudo account number may alternatively be generated by retrieving the pseudo account number from a memory or computer readable medium, wherein the pseudo account number was previously created and then stored.

Additionally, the payment processing network 110 is also operatively coupled to one or more issuer 112 systems through the transaction processing network 114. An issuer 112 is typically a business entity (e.g. a bank) that issues financial accounts. Issuers 112 generally track the accounts that are issued through the use of a primary account identifier. An issuer 112 may receive a transaction authorization message that is generated at a contactless reader 104, passed through a merchant 106 via an acquirer 108, to a payment processing network 110 and transmitted to the issuer 112 over a transaction processing network 114. The issuer 112 may then process the transaction authorization request message to determine if the transaction is authorized and return a response back to the merchant 106 through the use of the transaction processing network 114.

Figure 2:
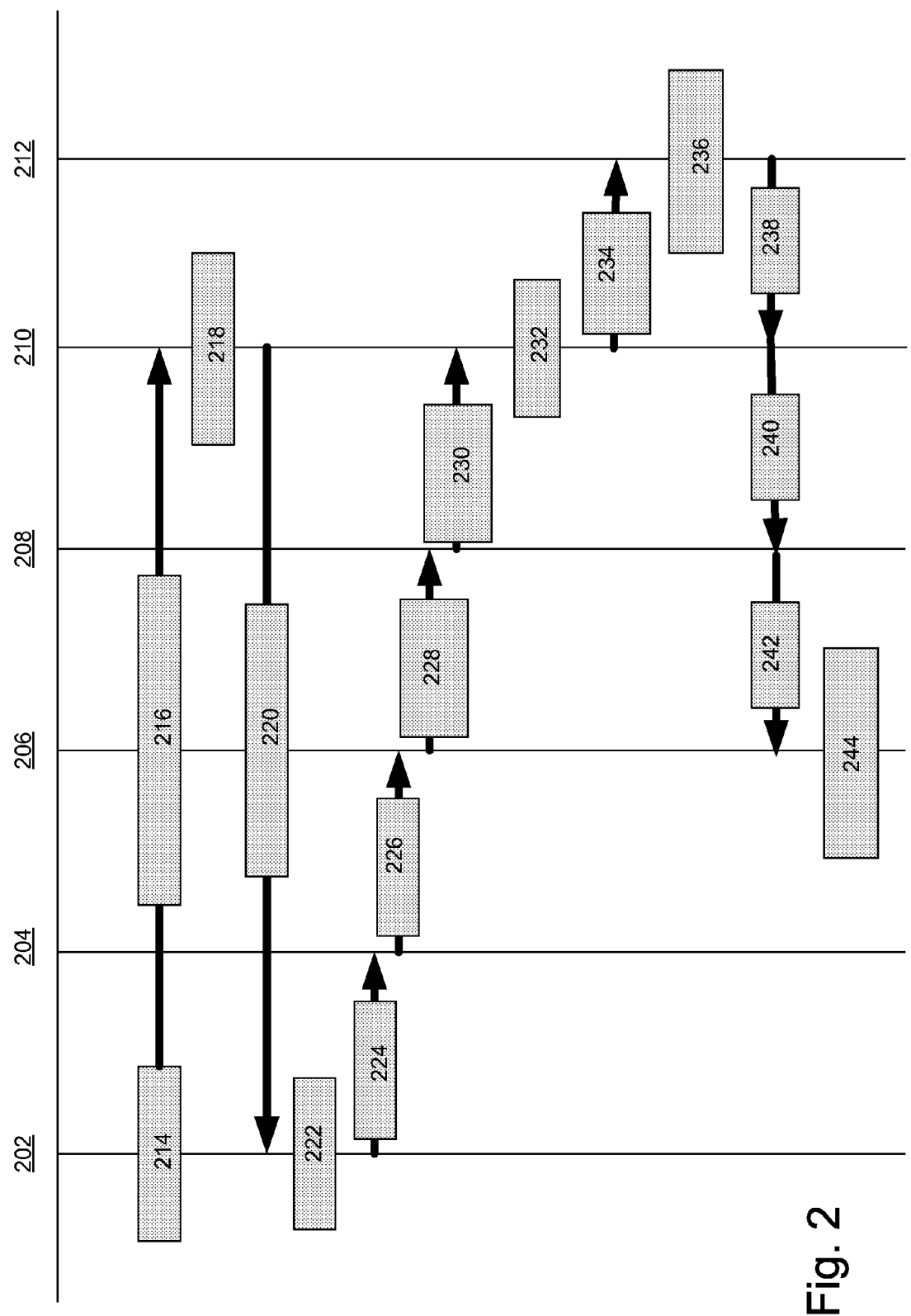
FIG. 2 is a message flow diagram illustrating message flows in one embodiment of a transaction processing system in accordance with the present invention.

FIG. 2 is a message flow diagram illustrating message flows in one embodiment of a transaction processing system in accordance with the present invention. In one exemplary embodiment, a transaction may begin at 214 when a user has selected goods and/or services that the user wishes to purchase. The user may begin by entering a Personal Identification Number (PIN) into the portable wireless device 202 in order to unlock the device. Although this exemplary embodiment uses a PIN to unlock the device, any other security mechanism, such as the use of a password, biometric information (e.g. fingerprint), or any other form of well known device access security may be used.

The user then may select which virtual card they wish to use to conduct the transaction 214. A virtual card corresponds to an account that the user has with an issuer and may be identified by the issuer through the use of a primary account identifier. A user may have several different accounts which may be issued by several different issuers. All of these accounts may be stored on the portable wireless device and the user selects which one he wishes to use for this transaction.

In this exemplary embodiment, the portable wireless device 202 may then request a pseudo primary account identifier that corresponds with a primary account identifier from the payment processing network 210. The request 216 for the pseudo account number will contain information that is necessary for the payment processing network to identify the primary account identifier and generate a pseudo primary account identifier. In one embodiment, the request message may contain the primary account identifier itself 216. The request message can be sent from the portable wireless device 202 to the payment processing network 210 over a communications network that is generally separate from the network used to authorize the transaction. In an alternative embodiment, the portable wireless device 202 may generate a pseudo primary account identifier that corresponds to a primary account identifier, and send the generated pseudo primary account identifier to the payment processing network 210.

The payment processing network 210 may then receive the request for a pseudo primary account identifier (PAI), along with sufficient information to identify the primary account identifier 216. The payment processing network 210 can then generate a pseudo primary account identifier and store the pseudo primary account identifier for later use 218. The pseudo primary account identifier may then be returned to the portable wireless device 202 through the communications network 220. The pseudo primary account number may then be used to conduct the transaction. Although in this exemplary embodiment, the pseudo primary account number is not requested until the user has entered his PIN, it should be noted that in alternative embodiments, the request could be made at any time. For example, a request for a pseudo primary account identifier could be made at the time the portable wireless device is powered on, at certain periodic time intervals, or at any time the portable wireless device is idle. In other alternative embodiments, the pseudo primary account identifier may not be requested but rather may be pushed from the payment processing network to the portable wireless device. In another alternative embodiment the pseudo primary account number is generated by the portable wireless device and sent to the payment processing network. The payment processing network can store the pseudo primary account identifier and send an acknowledgement of receipt to the portable wireless device.

Once the portable wireless device has received the pseudo primary account number, the transaction may continue. The user can hold the portable wireless device 202 in the vicinity 222 of the contactless reader 204. Through the use of the short range communications element in the portable wireless device 202, the pseudo primary account number may be transmitted 224 to the contactless reader 204 and to the merchant 206, 226. The pseudo primary account identifier can then be included in an authorization request message 228 that is sent to an acquirer 208. The acquirer 208 may then send the authorization request message that includes the pseudo primary account number 230 to the payment processing network 210. The messages that are sent between the merchant 206, the acquirer 208, and the payment processing network 210, are typically sent over a restricted access network that is separate from the communications channel used to request the pseudo primary account identifier.

The authorization request message containing the pseudo primary account identifier 230 may then be received by the payment processing network 210. Using the data stored when the pseudo primary account number was generated or received 218, the pseudo primary account identifier can be converted to the primary account identifier 232. An authorization request containing the real primary account identifier may then be sent 234 to an issuer 212 which can process the transaction to determine if it should be allowed or denied 236. The response to the authorization request message, indicating if the transaction is approved or not can then be sent 238 from the issuer 212, through the payment processing network 210, 240 and acquirer 208, 242, back to the merchant 206. Based on this response 242 the merchant can determine if the transaction should proceed or not 244.

Figure 3:
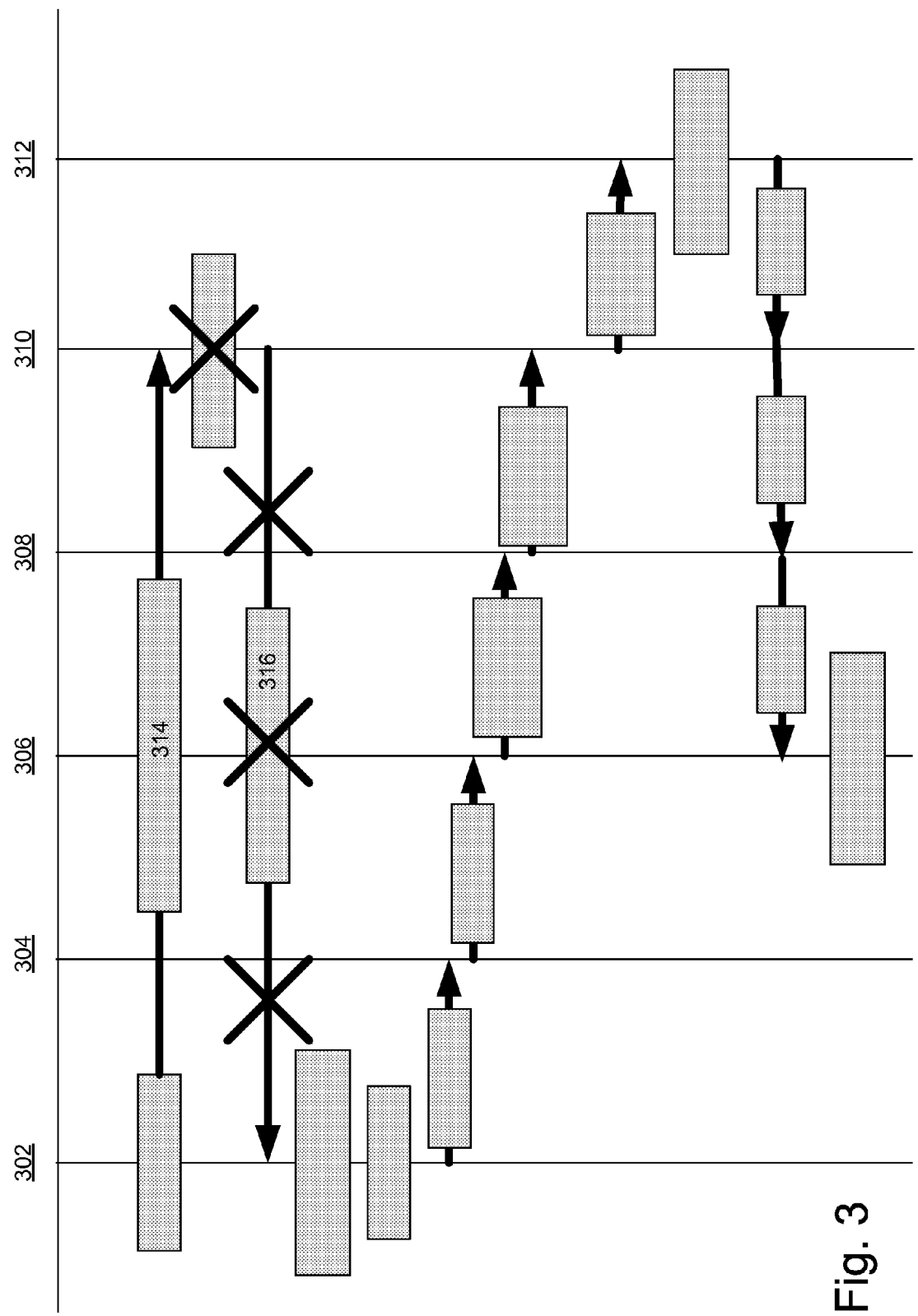
FIG. 3 is a message flow diagram illustrating an alternative message flow according to another embodiment of the invention.

FIG. 3 is a message flow diagram illustrating an alternative message flow according to another embodiment of the invention. In some cases, the communications network that may be used to request a pseudo primary account number may not be available. For example, this may occur when the portable wireless device attempts to use the cellular telephone network to request a pseudo primary identifier, but the portable wireless device is currently located in a dead spot, and such communication is not possible. As such, the portable wireless device may not be able to receive a pseudo primary account identifier. In such cases, it may be beneficial to allow the transaction to complete using the primary account identifier, although this will inherently be less secure than the operation as described in FIG. 2.

The message flow in FIG. 3 is for the most part the same as that of FIG. 2. The difference is at the point where the portable wireless device requests 314 and receives 316 the pseudo primary account identifier. In this case, it is possible in some embodiments for the transaction to proceed, using the same message flows as depicted in FIG. 2, with the exception that the primary account identifier is used instead of the pseudo primary account identifier. In such embodiments, it is further not necessary to convert the pseudo primary account identifier into a primary account identifier. Although less secure than the previous operation, this embodiment will still allow a transaction to complete in the case where the communications network is unavailable.

Figure 4:
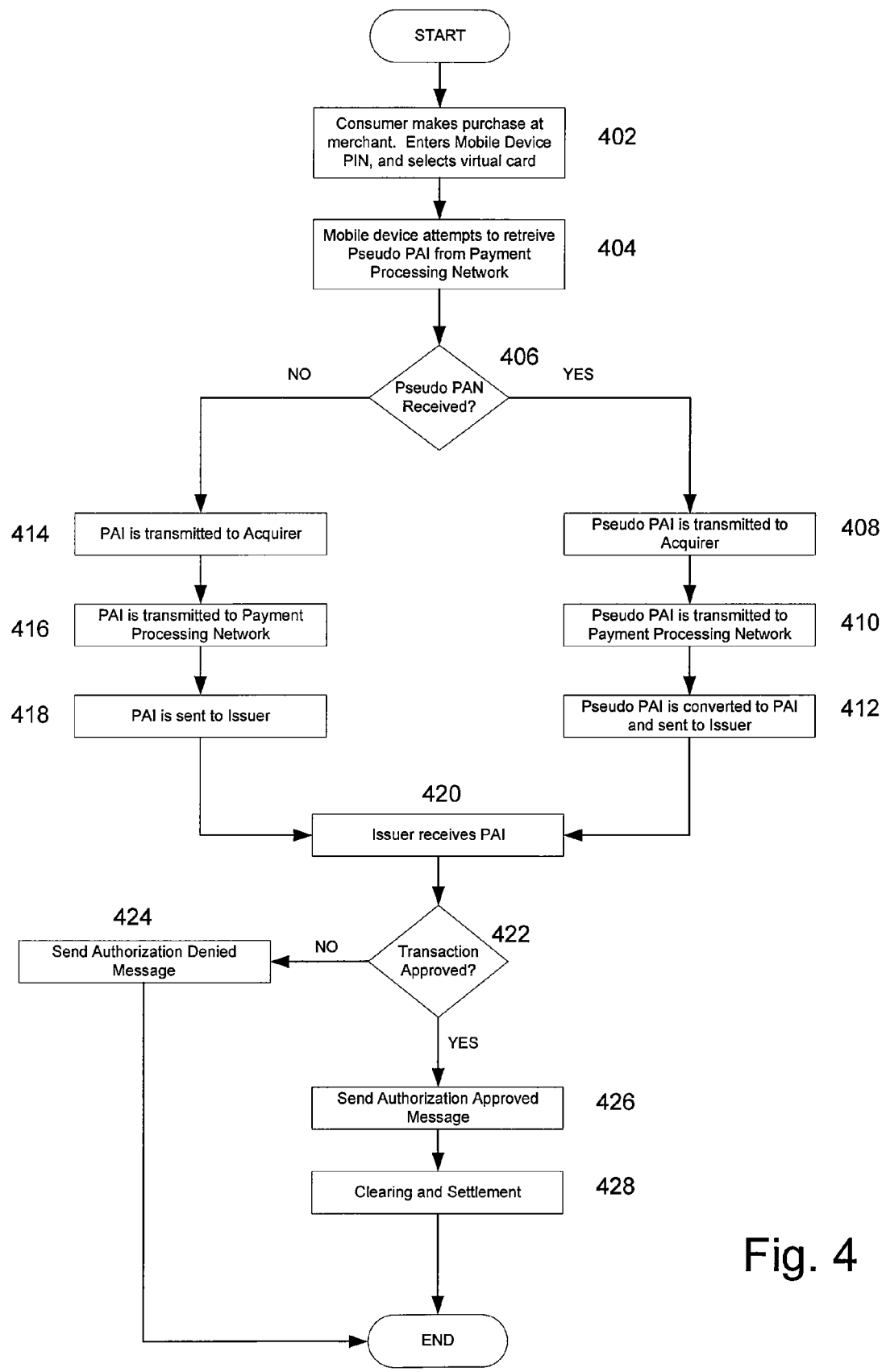
FIG. 4 is a high-level flow diagram illustrating one embodiment of a method of processing a transaction in accordance with the present invention.

FIG. 4 is a high-level flow diagram illustrating one embodiment of a method of processing a transaction in accordance with an embodiment of the present invention. The process begins at 402 where a consumer has chosen to purchase goods and or services from a merchant. The consumer enters a PIN into his portable wireless device to unlock the device. The consumer then further selects the account he wishes to use to make the purchase by selecting the virtual card that should be used to perform the transaction.

The process continues at step 404 where the portable wireless device attempts to retrieve a pseudo primary account identifier from the payment processing network. If a pseudo primary account identifier is successfully retrieved 406, the process moves to step 408 where the pseudo primary account number is transmitted to the acquirer. The acquirer then transmits the pseudo primary account identifier to the payment processing network 410. The payment processing network will then convert the pseudo primary account identifier back to the primary account identifier and further transmit the request to the issuer 412.

If the portable wireless device fails to retrieve a pseudo primary account identifier at step 406 the process continues on to step 414 where the transaction proceeds using the primary account identifier. The primary account identifier is transmitted from the portable wireless device to the acquirer at step 416. From there the acquirer transmits the primary account identifier to the payment processing network at step 418. Because no pseudo primary account identifier was retrieved, there is no need to convert the primary account identifier, and it is further transmitted to the issuer at step 418.

At step 420, the issuer receives the transaction request that contains the primary account identifier. Using any number of criteria, such as the account specified by the primary account identifier being in good standing, having sufficient funds available, having sufficient credit available, etc., the issuer makes a decision at step 422 to either approve or deny the transaction. If the transaction is denied, the process moves to step 424, and a message is returned indicating the transaction has been denied. If the transaction is approved at step 422 a message indicating approval is sent to the originator. Furthermore, settlement and clearing processes occur at step 428 to actually transfer funds from the account held at the issuer to the merchant.

Figure 5:
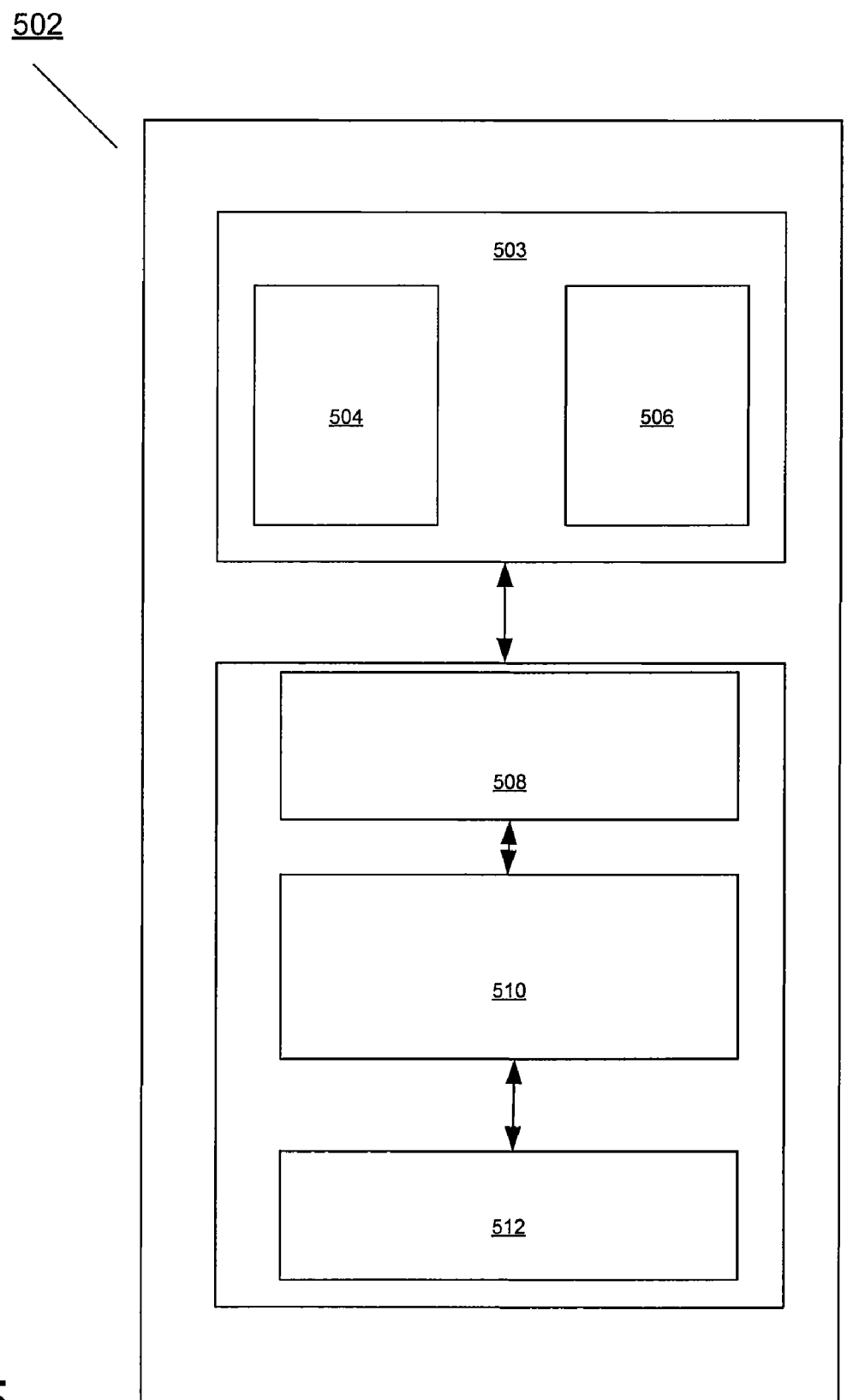
FIG. 5 is a high level block diagram illustrating a portable wireless device in accordance with the present invention.

FIG. 5 is a high level block diagram illustrating a portable wireless device in accordance with the present invention. The portable wireless device 502 may be virtually any type of device, such as a cellular phone, a personal digital assistant (PDA), pager, and the like, that may be configured to perform embodiments of the present invention. In one embodiment, portable wireless device 502 includes a communications module 503, which includes a long range wireless communications element 504, a short range wireless communications element 506, a processor 508 in communication with both the long and short range communications elements, and further in communication with a memory 510, and a user interface module 512.

The long range wireless communications element 504 may be designed to transmit and receive communications between the portable wireless device 502 and a wireless access point 118, the access point providing access to a communications network 116 through which the portable wireless device may communicate with a payment processing network 110. Any number of long range wireless communications elements are well known in the art and may be used to accomplish the reception and transmission of data between the portable wireless device 502 and the wireless access point 118. The long range wireless communications element may use any viable communications link such as optical transmission or RF transmission.

The short range wireless communications element 506 may be designed to transmit and receive communications between the portable wireless device 502 and a contactless reader 104. Any number of short range wireless communications elements are well known in the art and may be used to accomplish this function. In one embodiment, the short range wireless transmission element may be a RFID tag, although any suitable short range wireless transmission element may be used.

The processor 508 may be virtually any type of integrated circuit and/or data processing system, such as a microprocessor, field programmable gate array (FPGA), application specific integrated circuit (ASIC), and the like, that may be configured to perform embodiments of the present invention.

The memory 510 can be a non-volatile or volatile memory such as a random access memory that has sufficient space to hold the necessary programming and data structures of the invention. While the memory 510 is shown as a single entity, it should be understood that the memory 510 may in fact comprise a plurality of modules, and that the memory 510 may exist at multiple levels, from high speed registers and caches to lower speed but larger direct random access memory (DRAM) chips. In one embodiment, the memory 510 may include a program that includes computer code for receiving a pseudo primary account identifier through the long range wireless transmission element 504. The memory 510 may also include code for generating a pseudo primary account number and sending the pseudo primary account number using the long range wireless transmission element 504. The memory 510 may further include computer code for providing the pseudo primary account identifier to an access device including a contactless reader 104, through the short range wireless communications element 506. The memory 510 may also include code to store one or more primary account identifiers. The program may use any one of a number of different programming languages. For example, the program code can be written in PLC code (e.g., ladder logic), a higher-level language such as C, C++, Java, or a number of other languages.

The user interface module 512 may be any type of interface that allows a user to interact with the portable wireless device 502. Examples of such interfaces may be keypads, keyboards, touch screens, voice response units, and the like.

Embodiments of the invention have a number of advantages. First, since a pseudo account identifier is sent over a different communication network than the network that is used to conduct the authorization for the transaction, the merchant never receives the actual account identifier. There are many fraudulent merchants and this process reduces fraud as the merchant does not see the consumer's real account number. Second, since the "back end" server computer at the payment processing network (or at some other location) sends the pseudo account identifier, or alternatively receives a pseudo primary account identifier, it knows what account identifier to expect. The back end, remote server computer can change the pseudo account number as often as needed (e.g., with ever transaction, with every third transaction, etc.). Third, since the pseudo account identifier is retrieved (in some embodiments) when the user is selecting a virtual card or is otherwise manipulating his portable wireless device to conduct the transaction, the user does not experience any delay in conducting the purchase. The retrieval of the pseudo account identifier is transparent to the consumer, and the consumer need not know that the pseudo account identifier is ever retrieved. The same transparency to the consumer is also present in embodiments where the portable wireless device generates the pseudo primary account identifier.

Figure 6:
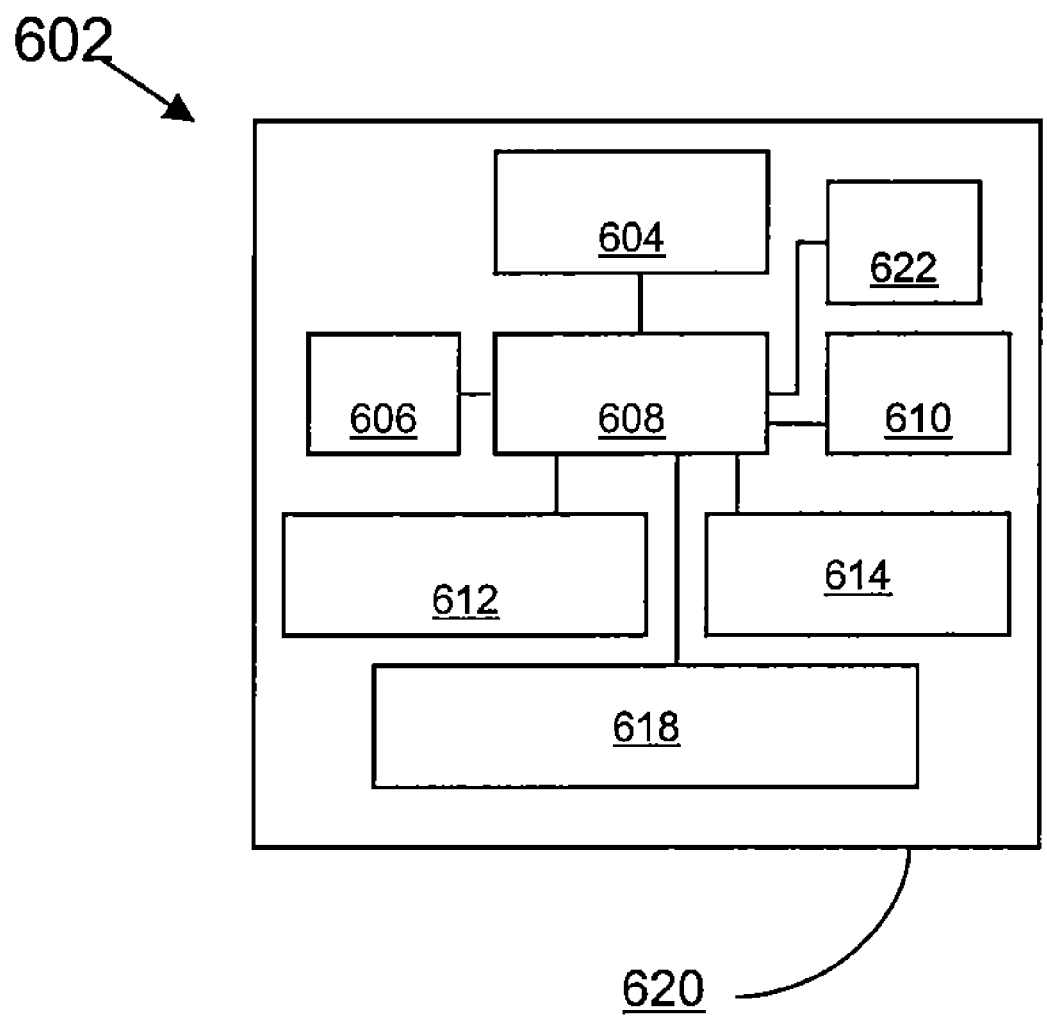
FIG. 6 shows block diagrams of portable consumer devices.

FIG. 6 shows block diagrams of portable computer devices and subsystems that may be present in computer apparatuses in systems according to embodiments of the invention.

The portable wireless device that is used in embodiments of the invention may be in any suitable form. For example, suitable portable wireless devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

An exemplary portable consumer device 602 in the form of a phone may comprise a computer readable medium and a body as shown in FIG. 6. FIG. 6 shows a number of components, and the portable wireless devices according to embodiments of the invention may comprise any suitable combination or subset of such components.) The computer readable medium 606 may be present within the body 620, or may be detachable from it. The body 620 may be in the form a plastic substrate, housing, or other structure. The computer readable medium 606 may be a memory that stores data and may be in any suitable form including a magnetic stripe, a memory chip, encryption algorithms, private or private keys, etc. The memory also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc.

Information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The portable wireless device 602 may further include a contactless element 618, which is typically implemented in the form of a semiconductor chip (or other data storage element) with an associated wireless transfer (e.g., data transmission) element, such as an antenna. Contactless element 618 is associated with (e.g., embedded within) portable consumer device 602 and data or control instructions transmitted via a cellular network may be applied to contactless element 618 by means of a contactless element interface (not shown). The contactless element interface functions to permit the exchange of data and/or control instructions between the mobile device circuitry (and hence the cellular network) and an optional contactless element 618.

Contactless element 618 is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the portable wireless device 602 and an interrogation device. Thus, the portable wireless device 602 is capable of communicating and transferring data and/or control instructions via both cellular network and near field communications capability.

The portable consumer device 602 may also include a processor 608 (e.g., a microprocessor) for processing the functions of the portable consumer device 602 and a display 610 to allow a consumer to see phone numbers and other information and messages. The portable wireless device 602 may further include input elements 612 to allow a consumer to input information into the device, a speaker 614 to allow the consumer to hear voice communication, music, etc., and a microphone 622 to allow the consumer to transmit her voice through the portable wireless device 602. The portable wireless device 602 may also include an antenna 604 for wireless data transfer (e.g., data transmission).

Figure 7:
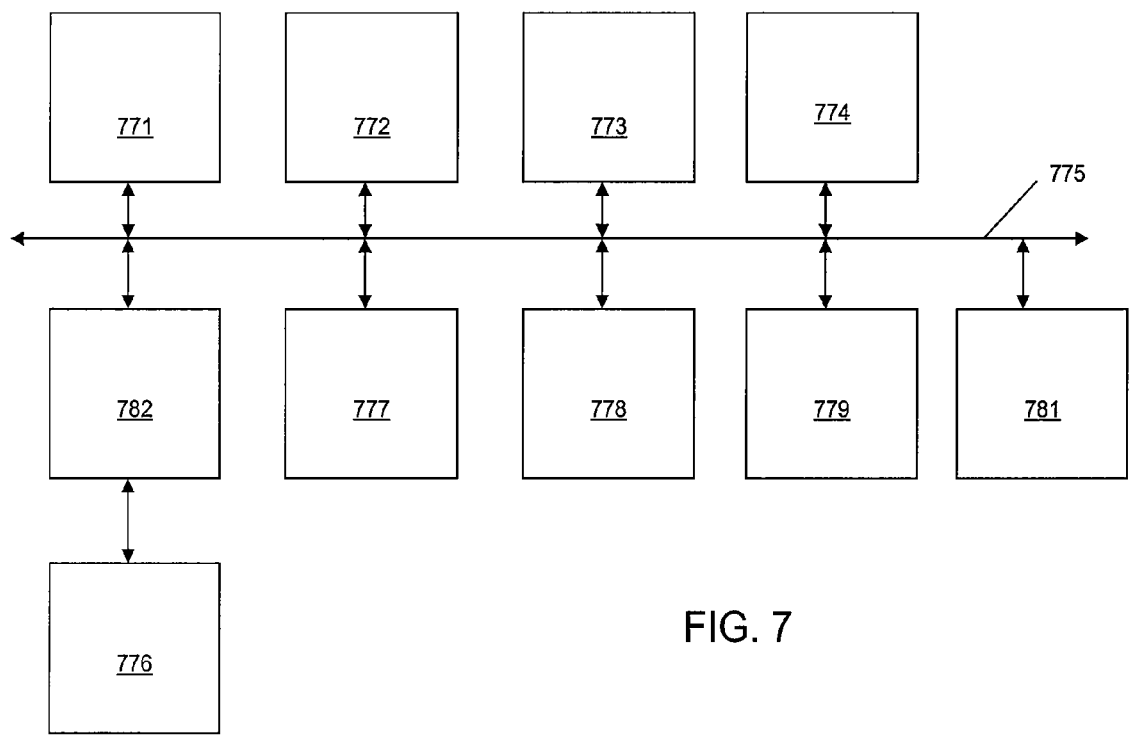
FIG. 7 shows a block diagram of a computer apparatus.

The various participants and elements in FIG. 1 may operate or use one or more computer apparatuses to facilitate the functions described herein. Any of the elements in FIG. 1 (e.g., the access device 104, the merchant 106, the acquirer 108, etc.) may use any suitable number of subsystems to facilitate the functions described herein. Examples of such subsystems or components are shown in FIG. 7. The subsystems shown in FIG. 7 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

A recitation of "a", "an" or "the" is intended to mean "one or more" unless specifically indicated to the contrary.

What is claimed is:

1. A method of conducting a transaction comprising:
receiving a PIN or password to unlock a portable wireless device;
 receiving a selection of an account from a plurality of accounts displayed on the portable wireless device;
 in response to receiving the selection of the account, sending a request for and receiving a pseudo account identifier that corresponds to a consumer's account identifier associated with the selected account at the portable wireless device, wherein the pseudo account identifier was previously generated by a remote server computer and was previously sent over a first network prior to receiving the pseudo account identifier, wherein the pseudo account identifier was generated in response to the selection of the account by the consumer without additional input from the consumer and wherein generation of the pseudo account identifier by the remote server computer and retrieval of the pseudo account identifier by the portable wireless device are transparent to the consumer, wherein the consumer is unaware that the pseudo account identifier was generated by the remote server computer and was received at the portable wireless device; and
providing the pseudo account identifier to an access device comprising a reader, wherein the access device is at a merchant and wherein the access device thereafter sends an authorization request message comprising the pseudo account identifier to a payment processing network comprising the remote server computer over a second network, wherein the payment processing network converts the pseudo account identifier in the authorization request message back to the consumer's account identifier and forwards the authorization request message to an issuer of the selected account, wherein the issuer thereafter sends an authorization response message, and wherein the access device thereafter receives the authorization response message from the issuer via the payment processing network, wherein the authorization response message indicates if the transaction is approved or not approved;
wherein the first network is a communications network and the second network is a transaction processing network, wherein the pseudo account identifier is transmitted from an RF communications element in the portable wireless device to the access device, and wherein the pseudo account identifier is received from the remote server computer via a long range communications element in the portable wireless device.

2. The method of claim 1 wherein the authorization response message is printed on a receipt that is generated by the access device, and the consumer receives the authorization response message by receiving the receipt.

3. The method of claim 1 wherein the authorization response message was sent to the consumer over the first network.

4. The method of claim 1 wherein the account identifier is a primary account number and wherein the pseudo account identifier is a pseudo account number.

5. The method of claim 1 wherein the access device comprises a contactless reader.

6. The method of claim 1, wherein the remote server computer initiates sending the pseudo account identifier to the portable wireless device.

7. The method of claim 1, further comprising if the long range communications element cannot receive the pseudo primary account identifier, providing the consumer's account identifier to the access device instead of the pseudo account identifier.

8. The method of claim 1, wherein the use of the pseudo account identifier is transparent to the merchant such that the merchant has no knowledge as to whether the pseudo account identifier or consumer's account identifier is being used in the transaction.

9. A method comprising:
receiving a request for a pseudo account identifier corresponding to a first account identifier, wherein the request is received over a first network, wherein the request for the pseudo account identifier is generated by the portable wireless device in response to a selection by a consumer of an account associated with the first account identifier without additional input from the consumer;
generating, by a remote server computer, a pseudo account identifier corresponding to the first account identifier;
sending the generated pseudo account identifier to the portable wireless device over the first network, wherein the portable wireless device is thereafter capable of performing one or more transactions by providing the pseudo account identifier to an access device, and wherein generation of the pseudo account identifier by the remote server computer and retrieval of the pseudo account identifier by the portable wireless device is transparent to the consumer, wherein the consumer is unaware that the pseudo account identifier was previously generated in response to the selection of the account associated with the first account identifier from a plurality of accounts displayed on the portable wireless device;
receiving an authorization request message comprising the pseudo account identifier over a second network;
converting the pseudo account identifier in the authorization request message to the first account identifier and forwarding the authorization request message to an issuer of the selected account, wherein the issuer thereafter sends an authorization response message;
receiving the authorization response message; and
forwarding the authorization response message received from the issuer to the access device;
wherein the first network is a communications network and the second network is a transaction processing network, wherein the pseudo account identifier is transmitted from an RF communications element in the portable wireless device to the access device, and wherein the pseudo account identifier is received from the remote server computer via a long range communications element in the portable wireless device.

10. The method of claim 9 further comprising storing the generated pseudo account identifier and its corresponding first account identifier.

11. A method comprising:
receiving, by an access device, a pseudo primary account identifier from a portable wireless device, wherein said pseudo primary account identifier corresponds to a primary account identifier and was generated without input from a consumer and the generation and retrieval of the pseudo account identifier is transparent to the consumer, wherein the consumer is unaware that the pseudo account identifier was generated by a remote server computer and was requested by the portable wireless device, wherein the pseudo account number was previously generated in response to a selection of an account associated with the first account identifier from a plurality of accounts displayed on the portable wireless device;
sending, by the access device, a transaction authorization request comprising the pseudo primary account identifier to a payment processing network, wherein the pseudo primary account identifier is thereafter converted to the primary account identifier, wherein the transaction authorization request is processed to approve or deny the transaction, and wherein the transaction authorization request with the primary account identifier is sent to an issuer of the primary account identifier; and
receiving, by the access device, an authorization response message from the issuer via the payment processing network, wherein the authorization response message indicates if the transaction is approved or not approved;
wherein the transaction authorization request is sent to the payment processing network over a transaction processing network, wherein the pseudo account identifier is transmitted from an RF communications element in the portable wireless device to the access device, and wherein the pseudo account identifier is received from the remote server computer via a long range communications element in the portable wireless device.

12. The method of claim 11 further comprising printing a receipt that indicates if the transaction is approved or not approved.

13. The method of claim 11 wherein the pseudo account identifier is received by the access device comprising a contactless reader.

14. A portable wireless device for performing proximity transactions comprising:
a long range wireless communication element; a short range communication element;
a processor coupled to the long range wireless communication element and the short range communication element;
a memory coupled to the processor, the memory comprising computer code for receiving a PIN or password from a consumer to unlock the portable wireless device, computer code for receiving a selection of an account from the consumer, computer code for receiving a pseudo account identifier that corresponds to a primary account identifier associated with the selected account, wherein the pseudo account identifier is generated by a remote server computer and was sent over a first network and is received by the portable wireless device using the long range communication element, wherein the pseudo account identifier was generated in response to the selection of the account by the consumer without additional input from the consumer and the generation and retrieval of the pseudo account identifier is transparent to the consumer, wherein the consumer is unaware that the pseudo account identifier is generated by the remote server computer and was requested by the portable wireless device, wherein the pseudo account number was previously generated in response to a selection of an account associated with the first account identifier from a plurality of accounts displayed on the portable wireless device, computer code for providing the pseudo account identifier to an access device comprising a reader using the short range communication element, and computer code for storing at least one primary account identifier,
wherein the portable wireless device is a phone, wherein the pseudo account identifier is transmitted from an RF communications element in the portable wireless device to the access device, and wherein the pseudo account identifier is received from the remote server computer via a long range communications element in the portable wireless device.

15. The portable wireless device of claim 14 further comprising a user interface module, wherein the user interface module allows the user to select one of the at least one primary account identifiers.

16. The portable wireless device of claim 14 wherein the memory coupled to the processor further comprises computer code for enabling and disabling the device.

17. The portable wireless device of claim 14 wherein the memory coupled to the processor further comprises computer code for selecting a primary account identifier to be used for a transaction.

18. The portable wireless device of claim 14 wherein the short range communications element is an RF communications element.

19. The method of claim 6 wherein the pseudo account identifier expires after a predetermined number of transactions.

* * * * *